United States Patent
Selvaraj

(10) Patent No.: US 10,701,450 B2
(45) Date of Patent: Jun. 30, 2020

(54) APPARATUS AND METHOD FOR NAVIGATING THROUGH MEDIA CONTENT

(71) Applicant: InterDigital CE Patent Holdings, SAS, Paris (FR)

(72) Inventor: Vijay Anand Selvaraj, Folcroft, PA (US)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 14/894,693

(22) PCT Filed: May 29, 2013

(86) PCT No.: PCT/US2013/043044
§ 371 (c)(1),
(2) Date: Nov. 30, 2015

(87) PCT Pub. No.: WO2014/193355
PCT Pub. Date: Dec. 4, 2014

(65) Prior Publication Data
US 2016/0134941 A1    May 12, 2016

(51) Int. Cl.
*H04N 21/482*  (2011.01)
*H04N 21/431*  (2011.01)
(Continued)

(52) U.S. Cl.
CPC ..... *H04N 21/482* (2013.01); *H04N 21/26283* (2013.01); *H04N 21/4312* (2013.01);
(Continued)

(58) Field of Classification Search
None
See application file for complete search history.

(56) References Cited

U.S. PATENT DOCUMENTS 8,108,535 B1  1/2012  Roberts et al.
8,554,278 B2  8/2013  Sammarco
(Continued)

FOREIGN PATENT DOCUMENTS

CA    2632772 C    12/2011
GB    2477800      8/2011
(Continued)

OTHER PUBLICATIONS

Softpedia, "YouTube's HTML5 Player Adds FieldsThumbnail Preview in Seebar", Apr. 20, 2012.

*Primary Examiner* — Fernando Alcon
(74) *Attorney, Agent, or Firm* — Invention Mine LLC

(57) ABSTRACT

A method for navigating through media content is described. The method (600) includes receiving (610) a media content stream, generating (620) a plurality of images associated with the media content stream after it is received, retrieving (630) information for a future media content stream, and providing (650) the information for the future media content stream along with the plurality of images for display along with the media content stream. The apparatus (300) includes an input signal receiver (302) that receives a media content stream, a video processor (310) that generates a plurality of images associated with the media content stream after it is received, a controller (314) retrieving information for a future media content stream that is available after the media content stream is received, and a display interface (315) providing the information for the future media content stream along with the plurality of images associated with the media content stream for display along with the media content stream.

39 Claims, 8 Drawing Sheets

(51) Int. Cl.
*H04N 21/462* (2011.01)
*H04N 21/8549* (2011.01)
*H04N 21/436* (2011.01)
*H04N 21/262* (2011.01)

(52) U.S. Cl.
CPC ... *H04N 21/4314* (2013.01); *H04N 21/43615* (2013.01); *H04N 21/4622* (2013.01); *H04N 21/4823* (2013.01); *H04N 21/4825* (2013.01); *H04N 21/8549* (2013.01)

(56) References Cited

U.S. PATENT DOCUMENTS

| | | | |
|---|---|---|---|
| 2005/0071886 A1* | 3/2005 | Deshpande | H04N 7/17336 725/135 |
| 2007/0016611 A1 | 1/2007 | Wang et al. | |
| 2007/0033632 A1 | 2/2007 | Baynger et al. | |
| 2008/0306967 A1 | 12/2008 | Fukuda et al. | |
| 2010/0306801 A1 | 2/2010 | Filippov et al. | |
| 2010/0150520 A1 | 6/2010 | Hopewood | |
| 2010/0262912 A1* | 10/2010 | Cha | G11B 27/105 715/719 |
| 2011/0271304 A1* | 11/2011 | Loretan | H04N 21/4438 725/41 |
| 2012/0005628 A1* | 1/2012 | Isozu | G06F 3/04842 715/838 |
| 2012/0010884 A1* | 1/2012 | Kocks | G10L 17/00 704/240 |
| 2013/0071095 A1* | 3/2013 | Chauvier | G11B 27/005 386/343 |
| 2013/0091432 A1 | 11/2013 | Shet et al. | |
| 2013/0332836 A1* | 12/2013 | Cho | G11B 20/10 715/723 |
| 2014/0366061 A1* | 12/2014 | Kim | H04N 21/8126 725/40 |

FOREIGN PATENT DOCUMENTS

| | | |
|---|---|---|
| KR | 20120095024 | 8/2012 |
| WO | WO 2009136327 | 11/2009 |
| WO | WO 2011001762 | 6/2011 |

* cited by examiner

APPARATUS AND METHOD FOR NAVIGATING THROUGH MEDIA CONTENT

This application claims the benefit, under 35 U.S.C. § 365 of International Application PCT/US13/43044, filed May 29, 2013, which was published in accordance with PCT Article 21(2) on Dec. 4, 2014 in English.

TECHNICAL FIELD OF THE INVENTION

The present disclosure generally relates to systems that provide media content and further including a visual timeline associated with media content and the current channel programming. More particularly, the present disclosure is related to an apparatus and method for navigating through current media content using visual representations associated with the current media content.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Broadcast content service providers and Internet service providers continue to find synergies within their respective content delivery systems. Many networked devices now include the ability to navigate and search through media content based on inherent capabilities from the provider of the media content or service. Networked devices, particularly those devices used in a home, are merging operations and functions associated with broadcast-centric and Internet network-centric devices. These networked devices include televisions, settop boxes, home gateways, home computer media stations, tablets, and the like. These networked devices further offer signal receiving, media recording, home networking, and Internet connectivity capabilities.

The user often has the ability to navigate through available video content in terms of what is currently being viewed and separately through what may be available for viewing. Video content navigation techniques for currently viewed content typically include features such as pause, fast forward, and rewind. These techniques and tools are often useful for navigating through previously recorded content. However, these techniques and tools may be less effective with live or currently delivered content and also lack visual cues related to the navigation through the content. For example, the user may wish to have a visual display of a timeline of the current program as is it is being displayed as well as additional information about future programming. The user may wish to rewind to a specific point in an earlier portion of a currently viewed program or to navigate in fast forward from a point in that program starting at a point that has previously been broadcast and displayed. The user may also wish to know when a currently viewed program is ending and what program will be shown following the current program. Computer video editing tools may provide related timeline management techniques for media content stored on the computer. However, these tools do not appear to work in a live video display setting and further do not include other future program identification as part of the navigation functions.

To address content that may be available for viewing broadcast content service providers often deliver a program guide that includes current and upcoming programming for the various channels in the service. A program guide allows a user to search for and navigate to other programs available from the service provider. The program guide is often downloaded to a user's home network device (e.g., gateway or settop box) through the broadcast network. The program guide contents and program information are then displayed on a display device based on requests from the user. However, the display of the program guide may not always be visually useful or ideally acceptable to the user, especially as it related to the currently viewed program. The information in the program guide is not always consistent with providing timeline of information for available programs in conjunction with the currently viewed program. As a result none of these structures, techniques, and tools addresses the needs of a user desiring a visual timeline for a currently viewed program that improves navigation and further shows future available program content. The present disclosure addresses these and other shortcomings related to media program content timeline presentation for current and future programming.

SUMMARY

According to an aspect of the present disclosure, a method for navigating through media content is described. The method includes receiving a media content stream, generating a plurality of images associated with the media content stream after it is received, retrieving information for a future media content stream that is available after the media content stream is received, and providing the information for the future media content stream along with the plurality of images for display along with the media content stream.

According to another aspect of the present disclosure, an apparatus for navigating through media content is described. The apparatus includes an input signal receiver that receives a media content stream, a video processor coupled to the input signal receiver, the video processor generating a plurality of images associated with the media content stream after it is received, a controller coupled to the video processor, the controller retrieving information for a future media content stream that is available after the media content stream is received, and a display interface coupled to the video processor, the display interface providing the information for the future media content stream along with the plurality of images associated with the media content stream for display along with the media content stream.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

Figure 1:
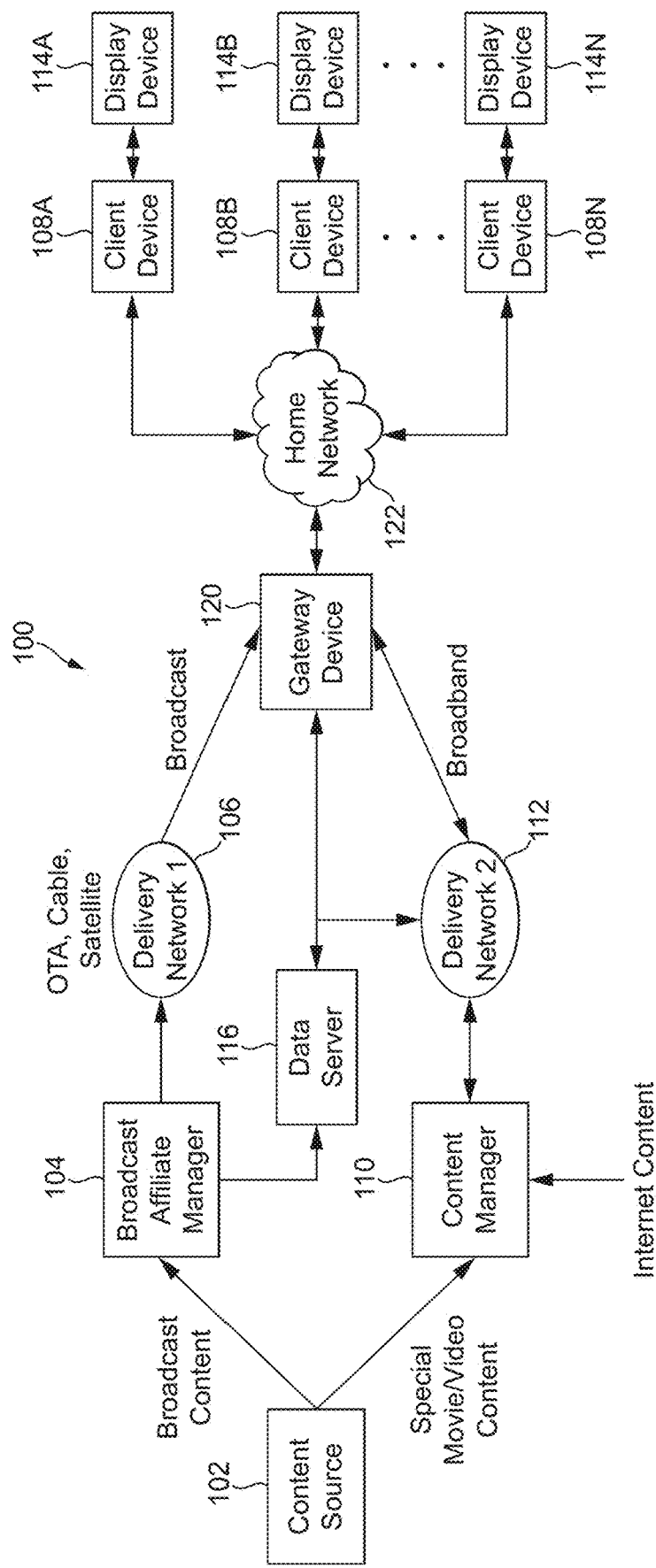
FIG. 1 is a block diagram of an exemplary system for delivering video content in accordance with the present disclosure.

It should be understood that the drawing(s) are for purposes of illustrating the concepts of the disclosure and not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments address problems associated with effectively navigating program content that includes information associated with a program currently being viewed. Video content navigation tools do not always provide a simple visual interface as part of a search and navigation tool. Conventional fast forward and rewind controls do not provide any information that includes a visual timeline or any other visual navigation cues. Program guide displays may show the program content for time slots and channels in a grid as text entries. However, these conventional guides do not include visual enhancements and further do not show a visual timeline incorporates both the current program content as well as future programs. The present embodiments address these problems by creating a navigation tool for media content. The media content may be delivered over a broadcast network or other similar media service provider network. The embodiments incorporate the use of thumbnails or small visual images as identifiers for points during the current program. The embodiments further include one or more thumbnails or text entries identifying future content available on, for instance, the currently tuned channel from the network.

The present disclosure describes a program display structure that includes a portion of the display dedicated to thumbnails identifying fast forward and rewind navigation points in a visual timeline for a currently viewed program. The thumbnails represent time points in the program for the portion of the program that has already been received and/or viewed. These thumbnails also may be applied to identifying future programs planned or available. A receiving device buffers or stores the received and/or viewed content. The receiving device makes this content available for navigation features. The navigation feature makes the content navigable or browsable using a series of thumbnail images (e.g., still video frames from the content). A rewind browse feature is available by navigating to one or more thumbnail images for the content that was already displayed. Further, a fast forward browse feature is available by navigating to one or more thumbnails (e.g., poster or still video frame) at a point in the time at the end of the currently viewed program. An additional fast forward feature is available by navigating to a thumbnail or text window showing the program or programs available at the end of the current program. Timeline display and navigation may be displayed and performed in terms of time relative to the current program or in terms of absolute time. Further, each thumbnail may represent its own video clip, which may be played when the user navigates to or pauses over the thumbnail.

Turning now to FIG. 1, a block diagram of an embodiment of a system 100 for delivering video content to the home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting Systems, now known as CBS Corporation, (CBS), etc. The broadcast affiliate manager 104 may collect and store the content, and may schedule delivery of the content over a delivery network, shown as delivery network 1 (106). Delivery network 1 (106) may include satellite link transmission from a national center to one or more regional or local centers. Delivery network 1 (106) may use any one of the standard transmission protocols and standards for content delivery (e.g., Advanced Television Systems Committee (ATSC) A/53, digital video broadcast (DVB)-Cable (DVB-C), DVB-Satellite (DVB-S), or DVB-Terrestrial (DVB-T)). Broadcast affiliate manager 104 may also create a data stream of program information and provide this information over delivery network 1 (106). This data stream of information may include, but is not limited to, program guide information, data (e.g., text, pictures, video, trailers, audio) associated with programming, delivery or broadcast schedules, or other types of information related to the broadcast content. Delivery network 1 (106) may also include local content delivery using local delivery systems such as over the air broadcast, satellite broadcast, or cable broadcast. The locally delivered content is provided to a gateway device 120 in a user's home. Broadcast affiliate manager 104 may also provide information (e.g., program guide content and other information about programs) to data server 116.

Additional information (e.g., special notices or scheduling information) or other content not provided to the broadcast affiliate manager may be delivered from content source 102 to a content manager 110. The content manager 110 may be a service provider affiliated with a content provider, broadcast service, or delivery network service. The content manager 110 may operate through an Internet website or web service. The content manager 110 may also incorporate Internet content into the delivery system. The content manager 110 may deliver the content to the user's gateway device 120 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Data server 116 receives the information from broadcast affiliate manager 104 and translates the information into a content stream suitable for delivery to a user device (e.g., client device 108). Data server 116 may include a web service for a web site or some networking site. Data server 116 may connect to delivery network 2 (112) to provide the content stream and information to the gateway device 120. Alternatively, data server 116 may include a network interface to a cellular network or other wireless delivery network and provide the content and information in a format compatibility with the wireless network directly to gateway device 120. Additionally, data server 116 may receive information from the Internet through for instance, content manager 110 and delivery network 2 (112). The additional interface permits other content, such as but not limited to information related to programs, supplemental content, and scheduling to be provided to and from data server 116 from sources other than broadcast affiliate manager 104 (e.g., other users, websites, or news agencies).

Gateway device 120 may receive different types of content from one or more of the delivery networks described earlier as well provide messages or information from devices in the user's home back to one or more of the delivery networks. Gateway device 120 processes the content and provides a separation of the content based on instructions provided with the content or over the delivery network. Gateway device 120 may also process and separate content based on instructions received via user commands communicated from client devices 108A-108N through home network 122. Gateway 120 may also provide storage, such as a hard drive or optical disk drive, for recording and/or storing the content as well as providing the content for playback through home network 122. Gateway device 120 may be a settop box, home media server, computer media station, home network gateway, multimedia player, modem, router, home network appliance, or the like.

Gateway device 120 provides the interface between the networks, operating as a wide area network (WAN), and the home network 122, operating as a local area network (LAN). Home network 122 may include both wired and wireless LAN communications. Wired communications may include physical interfaces and wiring for Ethernet, Multimedia over Coaxial cable Alliance (MoCA), or other similar signal formats. Wireless communications may include physical interfaces to accommodate one or more wireless formats including Wi-Fi, Institute of Electrical and Electronics Engineers standard IEEE 802.11 or other similar wireless communications protocols.

Home network 122 connects the gateway device 120 to client devices 108A-108N at the user's premises. Each of the client devices 108A-108N may include one or both interfaces for wired or wireless communication connection to the home network 122. Client devices 108A-108N may be a cable STB, Internet protocol (IP) STB, or satellite STB. The client devices 108A-108N may also be, but are not limited to, a computer device, tablet, display device, television, wireless phone, personal digital assistant (PDA), computers, gaming platform, remote control, multi-media player, or home networking appliance that includes both broadcast and Internet interfaces, and may further include a storage media for digital video recording. The client devices 108A-108N further process the content from gateway 120 provided through home network 122 and also process and manage user preferences and commands. The client devices 108A-108N may also include a storage device, such as a hard drive or optical disk drive, for recording and playing back audio and video content. Further details of the operation of the client devices 108A-108N and features associated with processing and playing back stored content will be described below in relation to FIG. 3.

The processed content from client devices 108A-108A is provided to display devices 114A-114N. The display devices 114A-114N may be conventional two-dimensional (2-D) type displays or may alternatively be advanced three-dimensional (3-D) type displays. It should be appreciated that other devices having display capabilities including, but not limited to, computer devices, tablets, gateways, display devices, televisions, wireless phones, PDAs, computers, gaming platforms, remote controls, multi-media players, home networking appliances or the like, may employ the teachings of the present disclosure and are considered within the scope of the present disclosure.

It is important to note that any media programs and content as well as any information related to the media programs and content (e.g., program guides, program metadata, visual images, or trailers) may originate at a content source (e.g., content source 102) or at a server device (e.g., server 116). The content and information may be transmitted to a content manager and eventually delivered over either delivery network 1 (106) or delivery network 2 (112) to a user's home (e.g., gateway device 120 and client devices 108A-108N). Alternatively, content and information from the content source may be delivered to a data server, such as data server 116, re-formatted, and then delivered to the user's home. Still further, content and information may originate at the data server (e.g., data server 116) or at a third party source on the Internet and provided to the data server 116 for delivery to the user's home.

In operation, system 100 provides the networking and communication capability for connecting and sharing media content from the WAN between devices on a home network principally through the use of gateway device 120 and client devices 108A-108N. In one embodiment, program content received from broadcast affiliate manager 104 is buffered in gateway device 120. Gateway device 120 provides the buffered content to client device 108A in response to a user request. A user may also request a visual timeline feature through client device 108A. Gateway device 120 further provides visual images, or thumbnails, representative of the received and buffered content at predetermined time points in order to create the visual timeline feature for the currently provided program. Further, data associated with one or more programs provided from broadcast affiliate manager 104 is also received by gateway device 120 and assembled into a program guide. Gateway device 120 may store the program guide and may also search for and acquire other data (e.g., visual images, video trailers) from another source (e.g., content manager 110 or data server 116) and either store this information. The information, including visual images, for a program that follows the program on the same receiving channel is provided to client device 108A along with the visual timeline feature.

In another embodiment, data associated with programs is received by gateway device 120 and assembled into a program guide is provided from broadcast affiliate manager 104 to client device 108B through gateway device 120. Gateway device 120 may store the program guide and may also search for and acquire other data (e.g., visual images, video trailers) from another source (e.g., content manager 110 or data server 116) and either store this information, pass on to the client device 108B, or both. At another point in time, the user of client device 108A desires to view the program and may request the program using the guide through a user interface. The program is provided for display to display device 114A through client device 108A. Gateway device 120 or client device 108A may begin recording the program and generating visual representations for points in the recorded program and also identify the next program at the end of the current program. The user of client device 108A may recall the visual timeline and navigate through the timeline elements and the program based on user inputs. The visual timeline, along with user control of the visual timeline, will be described in further detail below.

Figure 2:
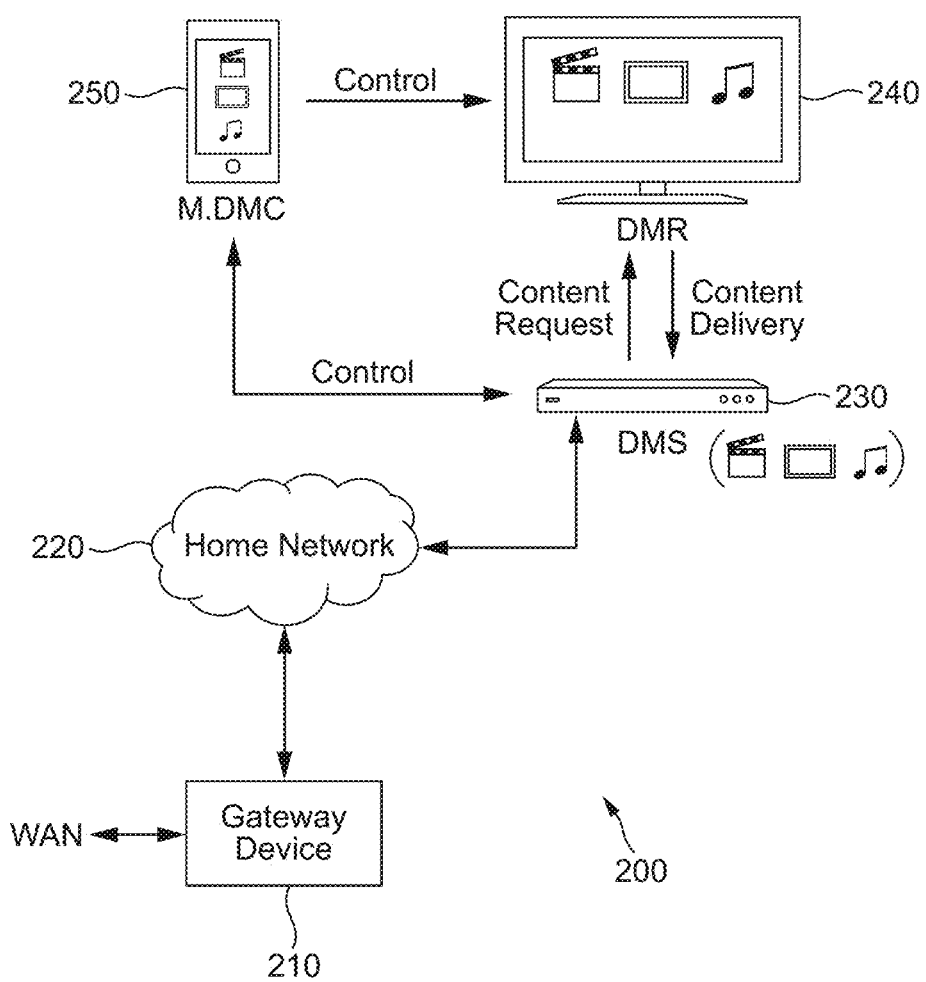
FIG. 2 is a block diagram of an exemplary home network system in accordance with the present disclosure.

Turning to FIG. 2, a block diagram of a home network system 200 according to aspects of the present disclosure is shown. Home network system 200 operates in a manner similar to the gateway device and the LAN portion of system 100 described in FIG. 1. In particular, home network system 200 operates according to functions associated with the DLNA protocol. In gateway system 200, Gateway 210 is interfaced between the WAN and home network 220. Home network 220 is connected to digital media server (DMS) 230. DMS 230 is connected to digital media renderer (DMR) 240. A mobile digital media controller (M-DMC) 250 is coupled to both DMS 230 and DMR 240. It is important to note that home network system 200 represents one possible embodiment of many possible home network systems based on the DLNA protocol or any other home network protocol.

Home network system 200 operates as part of a communication network and acts to interface data and media content between the WAN portion of the communication network and one or more devices on a home network. Gateway device 210 provides the interface between the WAN, and home network 220. In one embodiment, gateway 210 provides internet protocol (IP) services (e.g., data, voice, video, and/or audio) between a cable, DSL, or satellite WAN and DMS 230. Gateway 210 also provides IP services between DMS 230 and internet destinations identified and connected through the WAN. Gateway 210 also provides IP voice services between a phone device, such as a M-DMC 250, and call destinations routed through the WAN.

Home network 220 may include wireless communication capability. A wireless interface may be included in gateway device 210 and may accommodate one or more wireless formats including Wi-Fi, Institute of Electrical and Electronics Engineers standard IEEE 802.11 or other similar wireless communication formats. A similar wireless interface may be included in DMS 230 and may also be included in DMR 240 and M-DMC 250. Home network 220 may also include wired communication capability. A wired communication interface may be included in gateway device 210 and may accommodate one or more wired formats including Ethernet, MoCA, or other similar signal protocols. A similar wired interface may be included on DMS 230 as well as on DMR 240 and M-DMC 250.

Further, both the wired and wireless interfaces and communication formats in home network 220 may support a communication protocol between devices based on the DLNA protocol. DLNA defines interoperability guidelines to enable sharing of digital media content such as music, photos and videos between devices such as computers, TVs, printers, cameras, cell phones, and other multimedia devices. DLNA uses Universal Plug and Play (UPnP) for media management, discovery and control. UPnP defines the type of device that DLNA supports (e.g., "server", "renderer", "controller") and the mechanisms for accessing media over a network. The DLNA guidelines also apply a layer of restrictions over the types of media file formats, encodings and resolutions that a device must support.

DMS 230 interfaces to home network 220 and provides storage and playback capabilities for media content. DMS 230 acts as a DLNA "server" device. DMS 230 may include a user interface as well as the capability to be controlled by an external device, such as M-DMC 250. DMS 230 may also include video and audio conversion processors and functionality. DMS 230 may include a plurality of interface protocols for receiving and delivering media content to other networked devices (e.g., DMR 240 and M-DMC 250). These interface protocols include, but are not limited to DLNA, HDMI, SPDIF, and the like. DMS 230 may be a settop box, a personal computer, a network-attached storage (NAS) device, or the like.

DMR 240 interfaces to DMS 230 and provides video and audio display and reproduction capability. DMR 240 acts as a "renderer" device. DMR 240 may also include a user interface as well as the capability to be controlled by an external device, such as M-DMC 250. DMR 240 may be a television, audio/video receiver, video displays, remote speakers for music, or the like.

M-DMC 250 interfaces to both DMS 230 and DMR 240. M-DMC 250 acts as a "controller" device. Controller devices, such as M-DMC 250 discover and identify content on digital media servers (e.g., DMS 230) through a command and control interface as part of DLNA. M-DMC 250 may also direct the operation of one or more of the devices in the network. In some cases, M-DMC 250 may also provide content to the DMR 240, in addition to providing control for both DMS 230 and DMR 240. M-DMC 250 may be an Internet ready tablet device, Wi-Fi enabled digital camera, mobile cellular phone, advance remote control device, personal digital assistant, or the like.

It is important to note that one or all of the elements described in home network system 200 may be present in the same room or may be present in separate rooms at a user's premises. For example, gateway device 210 and DMS 230 may be located in a utility room, while DMR 240 and M-DMC 250 may be located in a family room. Also, more than one of the elements described in home network system 200 may be present in the user's premises and connected through home network 220 and/or operating using the DLNA protocol. For example, a second DMR may be located in a bed room and operated using M-DMC 250 with content provided through DMS 250.

Further, it is important to note that the functions described for gateway device 210 and DMS 230 may be merged into a single component or transferred and/or shared between components. For example, DMS 230 may include all functionality that is included in a gateway device, such as gateway device 210, and used as the interface to the WAN. Other devices, not shown, (e.g., computers, tablets, routers and the like), that are also connected to home network 220 would interface and communicate with DMS 230 in order to interface and communicate to the WAN.

Figure 3:
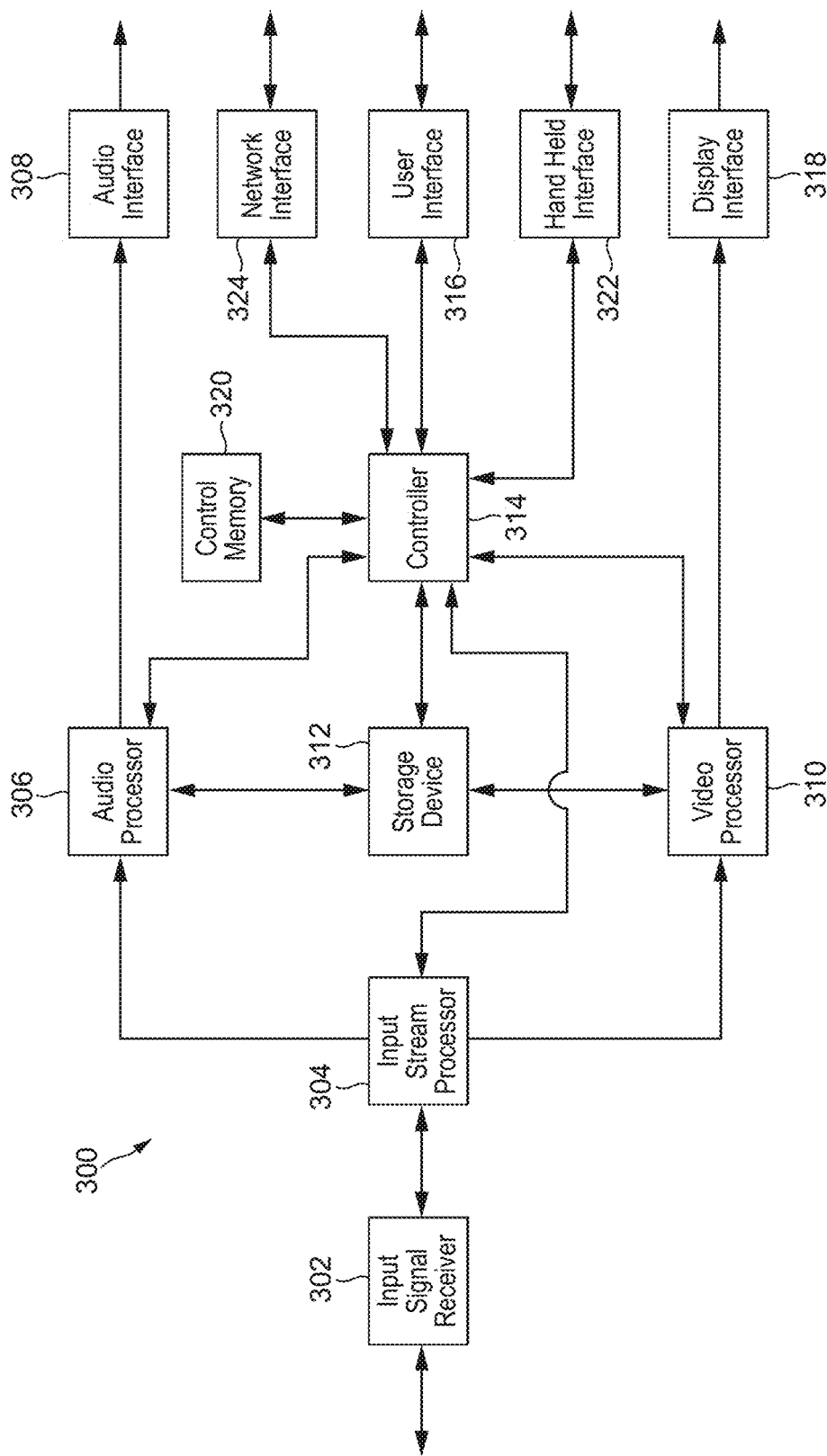
FIG. 3 is a block diagram of an exemplary network device in accordance with the present disclosure.

Turning now to FIG. 3, a block diagram of an embodiment of a network device 300 is shown. Except as described below, the network device 300 operates in a manner similar to client devices 108A-108N described in FIG. 1 or to gateway device 210 and/or DMS 230 described in FIG. 2. Network device 300 may also be incorporated into other systems including a display device, such as display devices 114A-114N, or DMR 240. In either case, several components necessary for complete operation of the system are not shown in the interest of conciseness, as the components not shown are well known to those skilled in the art.

Signals are interfaced to network device 300 at input signal receiver 302. Input signal receiver 302 connects to input stream processor 304. The input stream processor 304 connects to audio processor 306 and video processor 310. Audio processor 306 connects to audio interface 308, which provides the audio output signal from network device 300.

Video processor 310 connects to display interface 318 which provides the video output signal from network device 300. Audio processor 306 and video processor 310 also connect to a storage device 312. A controller 314 connects to the storage device 312, as well as input stream processor 304, audio processor 306, and video processor 310. A control memory 320 connects to the controller 314. Controller 314 also connects to user interface 316 and handheld interface 322.

Media content (e.g., audio/video programs, program guide information, and program data), as part of signal interfaced with the WAN, is received in an input signal receiver 302. The input signal receiver 302 may be one or more of several known receiver circuits used for receiving, demodulation, and decoding signals provided over one of the several possible networks including over the air, cable, satellite, Ethernet, fiber and phone line networks. It is important to note that input signal receiver 302 may include receiving, demodulation, and decoding circuitry for data signals as well as media content signals delivered over either the same delivery network as the desired broadcast input signal (i.e., delivery network 1 (106)) or over a different network, (i.e., delivery network 2 (112)) and/or an alternative cellular or wireless network as described in FIG. 1. The received media content and data over delivery network 2 (112) or wireless network may be different from the media content and delivery network 1 (106). The data may include information associated with scheduling changes and updates as well as information related to the media content delivered over either delivery network. In one embodiment, a cable broadcast signal is received, demodulated, and decoded in a cable tuner circuit in signal receiver 302. The desired broadcast input signal may be selected and retrieved in the input signal receiver 302 based on user input provided through a control interface (not shown). Input signal receiver 302 may also include an Internet protocol (IP) interface circuit that additionally provides bi-directional network connectivity.

The decoded output signal from one or more of the circuits in input signal receiver 302 is provided to an input stream processor 304. The input stream processor 304 performs the final signal selection and processing, and includes separation of video content from audio content for the content stream. The audio content is provided to an audio processor 306 for conversion from the received format (e.g., compressed digital signal) to another format (e.g., analog waveform signal). The analog waveform signal is provided to an audio interface 308 and further to a display device, such as display devices 114A-114N described in FIG. 1 and DMR 240 described in FIG. 2 or an audio amplifier (not shown). Alternatively, the audio interface 308 may provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 304 is provided to a video processor 310. The video signal may be one of several formats. The video processor 310 provides, as necessary a conversion of the video content, based on the input signal format. The video processor 310 also performs any necessary conversion for the storage of the video signals.

A storage device 312 stores audio and video content received at the input. The storage device 312 allows later retrieval and playback of the content under the control of a controller 314 and also based on commands, e.g., navigation instructions such as fast-forward (FF) and rewind (Rew), received from a user interface 316. The storage device 312 may be a hard disk drive, one or more large capacity integrated electronic memories, such as static RAM (SRAM), or dynamic RAM (DRAM), an interchangeable optical disk storage system such as a compact disk drive or digital video disk drive, or storage external to, and accessible by, network device 300.

The converted video signal, from the video processor 310, either originating from the input stream processor 304 or from the storage device 312, is provided to the display interface 318. The display interface 318 further provides the display signal to a display device of the type described above. The display interface 318 may be an analog signal interface, such as red-green-blue (RGB), or may be a digital interface (e.g., HDMI).

The controller 314 is interconnected via a bus to several of the components of the network device 300, including the input stream processor 302, audio processor 306, video processor 310, storage device 312, user interface 316, and handheld interface 322. The controller 314 manages the conversion process for converting the input stream signal into a signal for storage on the storage device or for display. The controller 314 also manages the retrieval and playback of stored content.

The controller 314 is further coupled to control memory 320 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 314. Control memory 320 may store instructions for controller 314. Control memory 320 may also store a database of elements, such as graphic elements representing still images for the displayed or recorded content. The database may be stored as a pattern of graphic elements. Alternatively, the control memory 320 may store the graphic elements in identified or grouped memory locations and use an access or location table to identify the memory locations for the various portions of information related to the graphic elements. Additional details related to the generation, storage, and display of the graphic elements will be described below. Further, the implementation of the control memory 320 may include several possible embodiments, such as a single memory device or, alternatively, more than one memory circuit communicatively connected or coupled together to form a shared or common memory. Still further, the control memory 320 may be included with other circuitry, such as portions of bus communications circuitry, in a larger circuit.

In addition to interfacing to a user interface element and a display device, network device 300 may also interface to a handheld device, such as a tablet, through handheld interface 322. This handheld device may include a display screen with additional controls or may include a touch screen. Video signals from video processor 310 as well as other data, such as the on screen display messages and message prompt returns, may be routed between controller 314 and handheld interface 322. Handheld interface 322 may transmit and receive signals and data with a handheld device or tablet using a radio frequency communications link, such as Wi-Fi, Bluetooth, or the IEEE standard 802.11. Handheld interface 322 may alternatively transmit and receive signals and data with a handheld device or tablet using an infra-red interface.

Network device 300 also includes the ability to generate and store visual image thumbnails representing still frame images at points in time in the received media content (e.g., video stream). Video processor 310, under control of controller 314, may process the received content to extract a still video frame. In an alternate embodiment, the received media content may be recorded into the storage device and the stored content retrieved and processed by video processor 310 to extract the still video frame. The extraction may occur at periodic intervals. The periodic intervals may be programmable by the user or may be set by design. In one embodiment, a time interval of ten minutes in the media content is used. The still video frames are further time indexed to the video content and stored along with the video content. The extraction of the still video frame may use any number of well known image capture techniques including, but not limited to, recovery of a compressed and encoded I-frame, decoding of an I-frame, or capturing and storing a field of frame of uncompressed video content directly into memory.

Network device 300 further includes the ability to receive and process program information (e.g., program guide data) including metadata and images associated with programs (e.g., upcoming program content to be delivered in the future). Some or all of the program information may be delivered as part of the data stream along with audio and video programs from a content service provider, such as broadcast affiliate manager 104 described in FIG. 1. Alternatively, some of the program information may be acquired or delivered from another source, such as a data server on the Internet (e.g., content manager 110 or data server 116 described in FIG. 1). Still further, images may be extracted from currently received programming. For example, if the network device 300 is receiving multiple programs simultaneously, then the guide entries for any of these current programs in progress may include a thumbnail still image extracted from the video content for those current programs. The program guide data is processed to separate visual images and video from the text information. If necessary, network device 300 may search for and acquire additional visual data for the programming that is part of the program guide information. Network device 300 generates a display of the program guide using the visual images.

In operation, network device 300 receives and processes media content for playback and display. Network device 300 further implements a process for managing the inputs for current and future programming available for display in order to generate a visual timeline based content navigation tool. Network device 200 provides a media program display structure that includes a portion of the display dedicated to the visual timeline feature. Thumbnail images in the timeline identify fast forward and rewind navigation capability and represent time points in the program as it is displayed. One or more of the thumbnail images also may be used to identify future programs. Network device 300 stores the received content, making at least the previously delivered content available as part of the visual timeline navigation feature.

In one embodiment, visual timeline navigation allows a quick rewind feature. Thumbnails of video frames for the currently viewed program will be generated and stored in the background in network device 300. Through a user control device, such as a remote control, a user may activate the thumbnail browsing which lists the thumbnails for the past time of the viewed program. The user can navigate to the desired thumbnail select the thumbnail. The thumbnail image may be selected by a button on the control device or through another user input. The video content will start playing from that previous point in time in the program.

In another embodiment, visual timeline navigation allows a quick fast forward feature while viewing past content. During the display and viewing of past video content accessed using the quick rewind feature described above, network device 300 continues generating and storing thumbnail images for the current program as it is received. A user may navigate to a thumbnail image that is forward in time relative to the currently displayed and viewed program. The thumbnail image may be selected by a button on the control device or through another user input. The video content will start playing from that future point in time relative to the current displayed point in the program.

In yet another embodiment, visual timeline navigation allows identification of future programs, implementing a fast forward view feature for the current program. One or more thumbnail images (e.g., program advertisement, movie or show poster, trailer) may be retrieved or generated for a future program (e.g., the next one or more programs available on the same received channel as the currently viewed program).

Alternatively, text information may be retrieved. The thumbnail image or text information is included in the visual timeline.

In a further embodiment, visual timeline navigation may allow viewing of a portion of the video content for the program in the thumbnail window. When the user is browsing the thumbnails and pauses on a particular thumbnail for a few seconds, a video clip (with/without audio) starting at that thumbnail image point in the program will begin playing in that thumbnail space.

In addition, the time indexing for the program and/or thumbnail images may use an absolute value that may be referenced to the current time. The time indexing may also use a time relative to the beginning or ending of the current program. For example, the thumbnail images may be indexed as T+/−x minutes where T is beginning or end of a program and x is the index time interval). Program indexing may also be limited or expanded to more or less than the time of one program (e.g., indexing of last one hour of programming regardless if the current program is a half hour or two hour program).

Figure 4:
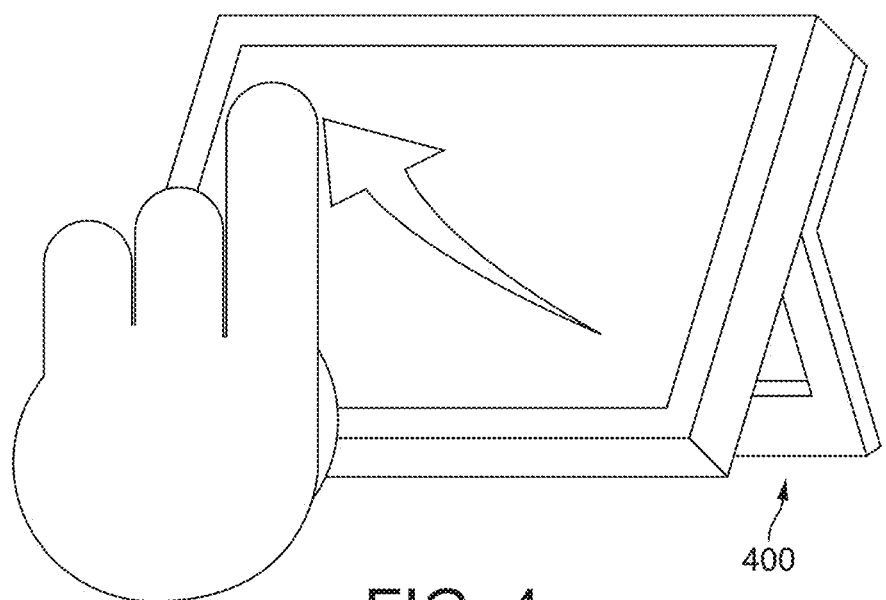
FIG. 4 is a perspective view of a touch panel device in accordance with the present disclosure.

The processes described in the present disclosure may employ an input device that can be used to express functions for navigating or browsing content on a device. To allow for this, a touch panel device 400, shown in FIG. 4, may be interfaced via the user interface 316 and/or handheld interface 322 in network device 300, as shown in FIG. 3. The touch panel device 400 may operate in a manner similar to that described for M-DMC 250 in FIG. 2 and permit control of other components in the home network, including DMS 230 and DMR 240. Touch panel device 400 further allows operation of a receiving device or set top box based on hand movements, or gestures, and actions translated through the panel into commands for the device (e.g., network device 300 or client device 108) or other control device. Further, touch panel device 400 may function as a second screen, allowing additional content, such as on screen display windows and messages to be displayed to the user without interrupting or obscuring the viewing of the main display device (e.g., display device 114).

In one embodiment, the touch panel device 400 may serve as a navigational tool to navigate the display of an electronic program guide or content display guide. In other embodiments, the touch panel device 400 may additionally serve as the display device allowing the user to more directly interact with the navigation through the grid guide showing display of content. It is important to note that the touch panel device 400 may be integrated into the settop box itself as part of, for instance, a front panel display or array. The touch panel device 400 may also be included as part of a remote control device containing more conventional control functions, such as activator or actuator buttons.

The functioning and control for generating, managing, and providing a visual timeline associated with current and future programming content using a network connected device may be encompassed as part of the operating code or firmware associated with the device (e.g., client devices 108A-108N in FIG. 1, gateway 210 or DMS 230 in FIG. 2 and network device 300 in FIG. 3). The process may include operating instructions written in any programming language (e.g., Java or hypertext markup language (HTML)). The application may be pre-loaded or downloaded (e.g., from a server or Internet site), and stored in a memory of the host device. It is to be appreciated that in one embodiment the instructions are stored in a memory (e.g., control memory 320 in FIG. 3) where the instructions are retrieved thereon and executed by a control circuit (e.g., controller 314). Further, the physical implementation of the algorithm or functions in the process may be done in hardware, such as discrete circuitry related to a video processor (e.g., video processor 310), or software, such as software residing in memory and read and executed by the control circuit. In another embodiment, the memory and a corresponding processor or controller to perform the processing may be integrated into a separate stand-alone integrated circuit (e.g., a digital processing processor (DSP) or an application specific integrated circuit (ASIC)).

Figure 5:
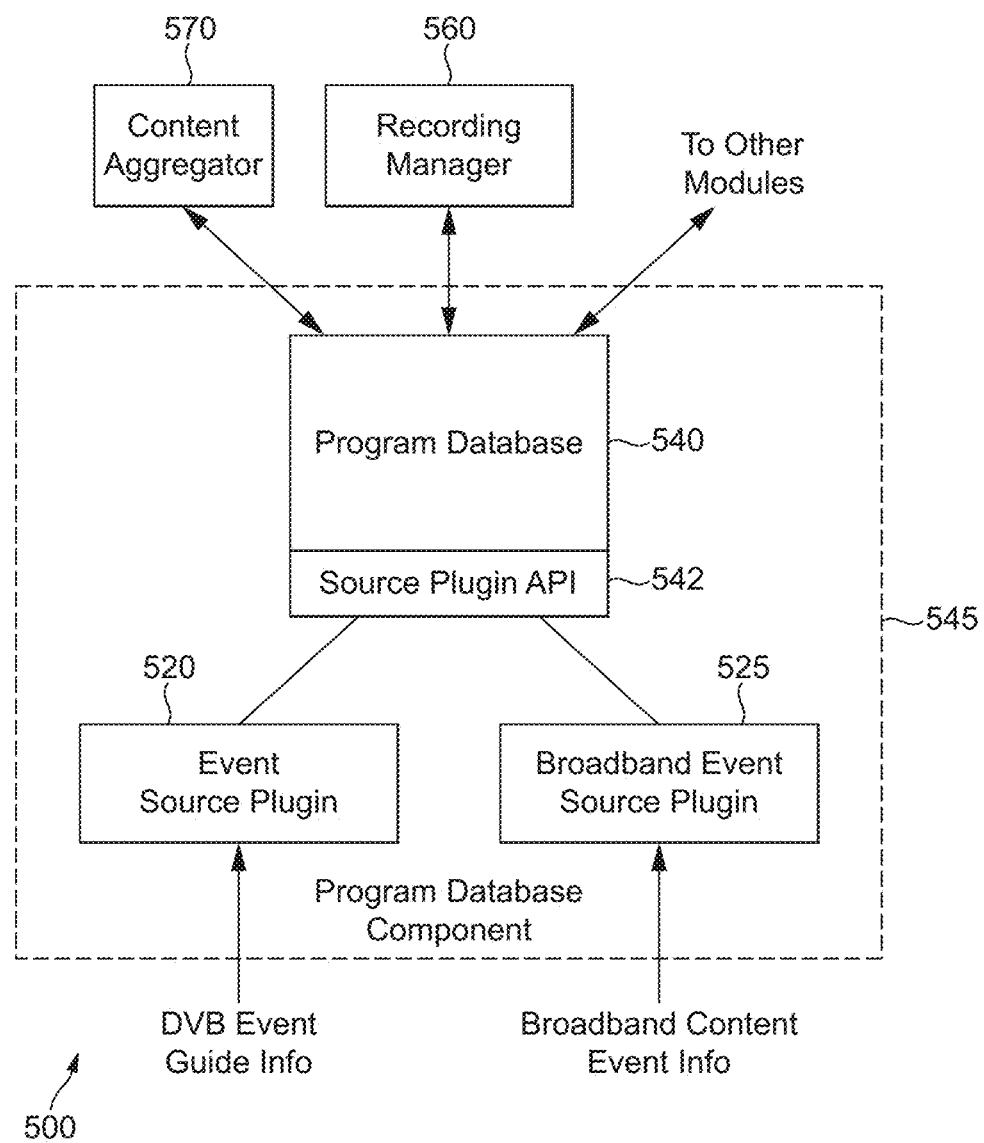
FIG. 5 is a diagram of an architecture for a portion of operating code for managing and providing a visual timeline used for navigating media content in accordance with the present disclosure.

Turning to FIG. 5, a diagram of an exemplary architecture 500 for a portion of operating code used to generate and manage a visual timeline for program content in a receiving device in accordance with aspects of the present disclosure is shown. Input data from a broadcast source (e.g., broadcast affiliate manager 104 described in FIG. 1) is passed to the broadcast event source plugin 520. Input data from a second source, a broadband content source (e.g., content manager 110 or data server 116 described in FIG. 1), is passed to the broadband event source plugin 525. The broadcast event source plugin 520 and broadband event source plugin 525 interface to the source plugin application programming interface (API) 542. Source plugin API 542 interfaces to program database 540. The program database 540 interfaces to both the program guide manager 560 and content aggregator 570. The source plugin API 542 may also provide for interfaces to other source plugins (not shown). Similarly the program database 540 provides for interfaces to other modules (not shown). Finally, the broadcast event source plugin 520, broadband event source plugin 525, source plugin API 542, and program database 540 are encompassed as a program database component 545.

The program database component 545 provides several services and functions for managing a content database within a device (e.g., network device 300). The program database component 545 provides a persistent storage of event information (e.g., database entries and information) that is retrievable after reboot of the device. The program database component 545 further provides efficient and flexible search interface functionality on event or entry information and criteria. The search functionality may include searching for specific information related to programs (e.g., genre, time slot). The search functionality may also include searching on combinations of criteria. The program database component 545 also provides a flexible interface for providing event or entry information to the program database 540.

The program database 540 is responsible for collecting and providing a searchable interface for event or entry information. The data provided for events (e.g., media content entries) may vary significantly between different service providers and networks. The program database 540 has been designed with a very flexible search input interface and database structure that allows the operating code to accommodate significant variations in event or entry data without specific knowledge of the details of the data being stored. In addition, the inputs to program database 540 are abstracted through source plugin API 542. The program database specifies an interface through the source plugin API 542 for the initial event processing. The source plugin API 542 does not include functions or operations that are exposed to other components (e.g., recording manager 560 and content aggregrator 570).

Broadcast event source plugin 520 and broadband event source plugin 525 for interfacing event sources are two of several possible shared libraries that can be called directly by program database 540. The broadcast event source plugin 520 provides specific interfacing to the program guide data that is carried within a broadcast signal stream adhering to one of the broadcast standards (e.g., DVB, ATSC). The broadband event source plugin 525 provides specific interfacing to one or more web or Internet based content delivery services. The separate source plugin API 542 is further defined to allow event sources to register with the program database 540 and provide event information. By using a plugin model customizations may be made for a particular service or content provider in the plugin without affecting the rest of program database component 545. The source plugin API 542 also includes interfaces for other source plugins (not shown) to further permit the program database 540 to accommodate event or entry data from multiple sources.

Program database 540 also provides a set of service definitions that allow components (e.g., recording manager 560 and content aggregator 570) to search and retrieve events or entries and accompanying information. Recording manager 560 uses information from program database 540 to schedule and manage recording of content received by a device (e.g., network device 300). These recordings may include automatic recording of currently viewed program content. The recordings may also be based on user preferences or predefined conditions (e.g., scheduled or series recordings) or may be initiated by a user request. Recording manager 560 may also control video still image extraction from the recorded content using one or more well known techniques as described earlier. Recording manager 560 also receives event (e.g., program guide) updates from program database 540 to adjust the recording schedule when schedule changes occur. Recording manager 560 may maintain the various video still image and program guide components as part of a database and assemble the visual timeline associated with the program content for display based on a user request.

Content aggregator 570 gathers and further identifies content that either exists, or is available, from multiple sources interfaced to the device (e.g., network device 300). These sources include any event or program data provided by program database 540. Other sources may include previously recorded content residing on the device, downloaded content residing on the device, and user content residing on a USB stick or the home network. Content aggregator 570 provides a single interface for providing information about all available content. Content aggregator 570 may further interface to other modules or services within the software architecture, including, but not limited to, a digital living network alliance (DLNA) service, a user interface for a local display device, and a remote client running on a tablet.

Architecture 500 may be used in a device (e.g., network device 300 described in FIG. 3) to navigate through media content that is displayed on a display device. Recorded content processed in architecture 500 may be used to generate thumbnails identifying fast forward and rewind navigation points in a visual timeline for a currently viewed program. The navigation feature makes the content navigable using a series of thumbnail images (e.g., still video frames from the content) displayed as a timeline. Rewind may be performed by navigating to one or more thumbnail images for content that was already viewed. Further, an effective fast forward is available by navigating to one or more thumbnails (e.g., poster or still video frame) at a point in the time at the end of the currently viewed program. An additional fast forward is performed by navigating to a thumbnail or text window showing the program or programs available at the end of the current program. Timeline display and navigation may be displayed and performed in terms of time relative to the current program or in terms of absolute time. Further, each thumbnail may represent its own video clip, which may be played when the user navigates to or pauses over the thumbnail.

The process described below allows a user to display a visual content timeline for current and future program content and further allow user navigation, such as fast forward, rewind, and preview features, using the visual content timeline. The process describes a program display structure that includes a portion of the display dedicated to thumbnail images identifying fast forward and rewind navigation points in a visual timeline. Thumbnail images in the timeline identify fast forward and rewind navigation capability and represent time points in the program as it is displayed. One or more of the thumbnail images may also be used to identify future programs. Network device 300 stores the received content, making at least the previously delivered content available as part of the visual timeline navigation feature. The thumbnails represent points in the program as it was received and displayed. These thumbnails also may be applied to identifying future programs planned or available. The content is stored or buffered, making at least the previously delivered content available for a rewind feature. The navigation tool makes the content navigable or browsable using the series of thumbnail images (e.g., still video frames from the content). The navigation tool allows fast forward and rewind features as well as additional video display features. The process may be used in various arrangements and program architectures, including architecture 500 described in FIG. 5. Further, the process may be included in various devices, including network device 300, DMS 230, gateway device 120, and client devices 108A-108N described previously.

Figure 6:
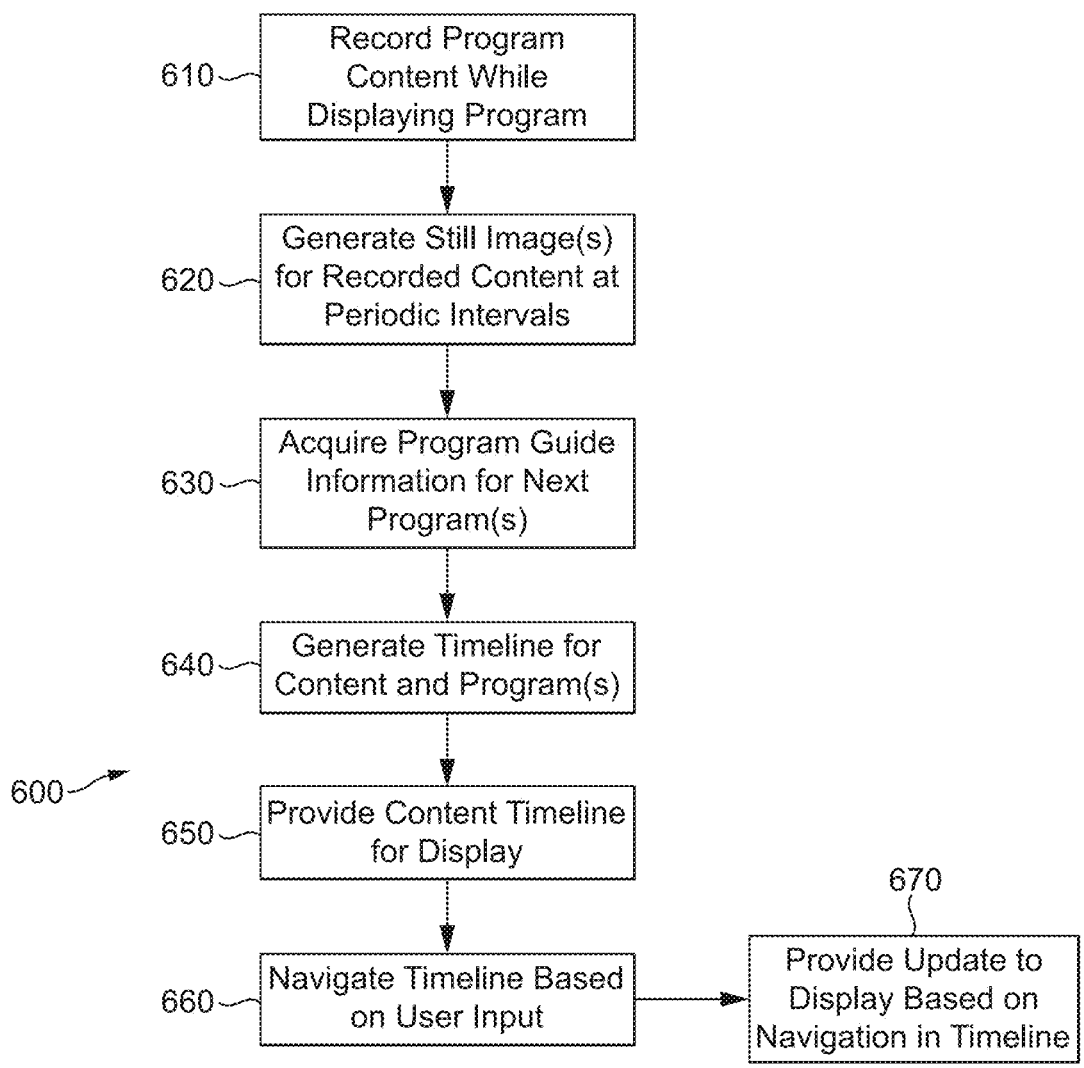
FIG. 6 is a flowchart of an exemplary process for displaying a visual timeline and navigating media content programming in accordance with the present disclosure.

Turning now to FIG. 6 a process 600 for generating and providing a visual timeline for display of media content programming in accordance with the present disclosure is shown. Process 600 described below may be used to improve operation and navigation while viewing a current program. Process 600 will primarily be described with respect to the network device 300 described in FIG. 3. However, one or more of the steps in process 600 may be equally applicable to one or more of the elements described in FIG. 2 or to gateway device 120 and client devices 108A-108N described in FIG. 1. It is important to note that some of the steps described in process 600 may be implemented more than once, or may be implemented recursively. Such modifications may be made without any effect to the overall aspects of either process 600.

At step 610, a program that is currently being requested, received, and provided for display is recorded. The recording, at step 610, may be performed by directing an output for display from a video processor, such as video processor 310, to a local storage device, such as storage device 312, or to a separate storage device. The recording may alternatively be performed on an external device, such as gateway device 120 described in FIG. 1.

Next, at step 620, the recorded content is processed to generate still images from the recorded content. The generating, at step 620, may include extracting a still video frame from the media content stream during the recording. The generating, at step 620, may also including extracting a still video frame from the media content after recording by retrieving the recorded content and processing the content in a video processor (e.g., video processor 310). The extraction of still video frames may use any number of well known image capture techniques including, but not limited to, recovery of a compressed and encoded I-frame, decoding of an I-frame, or capturing and storing a field of frame of uncompressed video content directly into memory.

The generation, at step 620, may occur at periodic intervals. These periodic intervals may be programmable by the user or may be set by design. In one embodiment, a time interval of ten minutes in the media content is used. These still video frames are further time indexed to the video content.

The generation, at step 620, may also include storing the extracted still images as visual elements or thumbnails to include in a visual timeline. The visual elements may be stored along with the recorded content. Alternatively, the visual elements may be stored separately as a database or pattern of elements in the same memory as the recorded content (e.g., storage device 312) or in a separate memory (e.g., control memory 320).

At step 630, program guide data that is received in the device is processed to identify program information to include in the visual timeline. For example, program information may be identified, at step 630, for the program or programs available at the conclusion of the currently viewed and displayed program. The program information may be limited to programs on the same channel as the currently viewed and displayed program. In some embodiments, the processing at step 630 may include identifying video information and visual images based on the file type or based on some other characteristic of the information. A search may be initiated to acquire additional visual data for the programming that is part of the program guide information. In other embodiments, the processing at step 630 is limited to identifying and extracting text information for the program or programs.

At step 640, a visual timeline is generated for display. The visual timeline is assembled be retrieving the visual images or thumbnails generated at step 620 and assembling the thumbnails into a graphic visual display. The thumbnails are assembled into an order based on a time index. Time indexing for the program and/or thumbnail images may use an absolute value that may be referenced to the current time. The time indexing may also use a time relative to the beginning or ending of the current program. For example, the thumbnail images may be indexed as T+/−x minutes where T is beginning or end of a program and x is the index time interval). Program indexing may also be limited or expanded to more or less than the time of one program (e.g., indexing of last one hour of programming regardless if the current program is a half hour or two hour program).

Also, at step 640, the generation of the visual timeline may include retrieving information (e.g., visual images and thumbnails or text) associated with one or more programs available at the conclusion of the currently viewed and displayed program. The information may be included and indexed to appear at the end (e.g., the far right) of the visual timeline. Further, the visual images, thumbnails, or text information may be in a graphic visual display as separate small windows. The graphic visual display may also include a window for the currently viewed and displayed program. The currently viewed and displayed program may be scaled from the normal full size on the display to a size that fits in the window in the graphic visual display.

At step 650, the visual timeline generated at step 640 is provided to a display device for display. The visual timeline may be provided to the display as a separate display element or may be provided as part of a graphic visual display including the currently viewed program. The timeline may be generated, at step 640, or provided, at step 650, as a result of a user request or user input selecting the visual timeline navigation feature. The timeline may also be generated, at step 640, or provided, at step 650, automatically when a program is viewed.

At step 660, a user input requesting a navigation feature using the visual timeline is received. The user input may be received through a user interface, such as user interface 316 or handheld interface 322, from a user control device, such as a remote control or handheld tablet. In response to the user input at step 660, at step 670, a navigation response is performed using the visual timeline. Several possible user inputs and navigation responses are possible and are described further below.

In one embodiment, a user requests, at step 660, a rewind feature. A user may activate the thumbnail browsing which lists the thumbnails for the past time of the viewed program. The user navigates or scrolls to the desired thumbnail for a previous point in time and selects the thumbnail. The thumbnail image may be selected by a button on the control device or through another user input. The video content will start playing, at step 670, from that previous point in time in the program in response to the user input.

In another embodiment, a user requests, at step 660, a fast forward from previous time feature. With the visual timeline displayed, the user navigates or scrolls to the desired thumbnail that is at a point that is ahead in time relative to the currently display program time. The video content will start playing, at step 670, from that future point in time relative to the current displayed point in the program.

In yet another embodiment, a user requests, at step 660, a fast forward identification of future program feature. With the visual timeline displayed, the user navigates or scrolls to and displays, at step 670, the one or more thumbnail images (e.g., program advertisement, movie or show poster, trailer) for a future program (e.g., the next one or more programs available on the same received channel as the currently viewed program). Alternatively, the text information may be retrieved and displayed.

In a further embodiment, a user requests, at step 660, a review or preview feature. With the visual timeline displayed, the user navigates or scrolls to the desired thumbnail image. The user hovers over the thumbnail image for a predetermined time period (e.g., two seconds) or separates selects the thumbnail image with a different user control. In response, at step 670. A video clip for the content starting at that point begins playing in the location for the thumbnail image. The thumbnail window may also enlarge in size to improve of the video clip by the user. The video clip may stop in response to another user input, such as the user moving the cursor from the time slot.

It is important to note that the steps in process 600 describe only a preferred embodiment. In other embodiments, certain steps in process 600 may be rearranged or may be eliminated. For example, in one embodiment, the generation of still video images at step 620 may occur after acquiring and processing the program guide information, at step 630. Further, although the steps in process 600 are shown as being performed serially, it is possible that one or more of the steps may be performed in parallel. For instance, generation of still video images at step 620 and acquiring and processing the program guide information, at step 630, with the results from these steps leading to the subsequent generation at step 640 directly, as described above. Further, the generation of still video at step 620 may occur while recording the content, at step 610.

Figure 7:
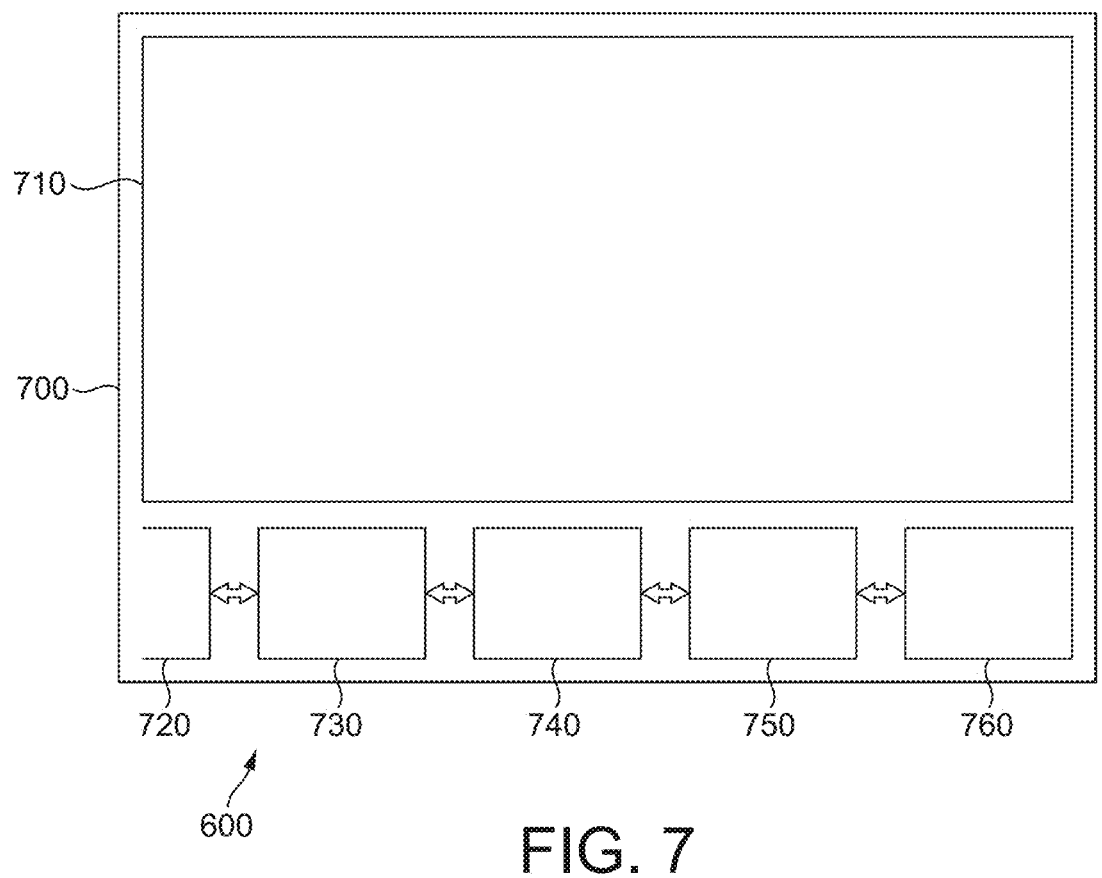
FIG. 7 is a diagram illustrating an exemplary view of a content display window including a visual timeline for media content navigation in accordance with the present disclosure.

Turning to FIG. 7, a diagram illustrating an exemplary view of a content display window 700 including a visual timeline for media content programming in accordance with the present disclosure is shown. Content display window 700 is shown as a visual display on a display device, such as one of the display devices 114A-114N described in FIG. 1, and displays content received and processed in a client or host device (e.g., one of client devices 108A-108N described in FIG. 1, gateway 210 or DMS 230 described in FIG. 2, or network device 300 described in FIG. 3).

The display of the content display window 700 may be initiated by a user input (e.g., pressing a button on a remote control). Content display window 700 includes a currently viewed content window 710. Several smaller thumbnail display windows, 720, 730, 740, 750, and 760, are shown below window 710. Each of these thumbnail windows 720, 730, 740, 750, and 760 represent a point in a visual timeline related to the currently viewed content shown in window 710. The first window 720 is shown only partially in view. In some embodiments, the first and last windows may be shown only partially in view, while in other embodiments all windows may be shown fully in view. The time points for each of the thumbnail display windows 720, 730, 740, 750, and 760 may be indexed based on an absolute (e.g., current time) or may be indexed relative to the beginning or ending of the program.

In one embodiment, the currently viewed program is one hour long and the current time is 8:49 PM and the time increment between images is ten minutes. As a result, window 720 shows a thumbnail image for 8:00, window 730 shows a thumbnail image for 8:10, window 740 shows a thumbnail image for 8:20, window 750 shows a thumbnail image for 8:30, and window 740 shows a thumbnail image for 8:40.

In another embodiment, the currently viewed program has an elapsed time of 49 minutes from its beginning and the time increment is 5 minutes. As a result, window 720 shows a thumbnail image for 25 minutes elapsed time, window 730 shows a thumbnail image for 30 minutes elapsed time, window 740 shows a thumbnail image for 35 minutes elapsed time, window 750 shows a thumbnail image for 40 minutes elapsed time, and window 760 shows a thumbnail image for the program at 45 minutes elapsed time.

Although the thumbnail images are described as being generated and displayed at periodic time intervals, other generation and/or display intervals may be possible. Thumbnail images may be generated at specific time intervals and the display of the thumbnail images may be weighted in a manner to favor one time period or another. For example, the thumbnail images may be generated at 5 minute time intervals. The display of the thumbnails may show the most recent two generated thumbnail images, then may show the thumbnail image for a time point 20 minutes previous, and then may show the thumbnail image for a point at the start of the program. Other possible arrangements for the generation and display of the thumbnail images are possible.

It is important to note that although content display window include thumbnail display windows and thumbnail images for previous content, one or more thumbnail images may represent programs available at the end of the current program. For example, thumbnail display window 760 may include a thumbnail image or text information for the program that available at the end of the currently viewed program on the same broadcast channel.

Figure 8:
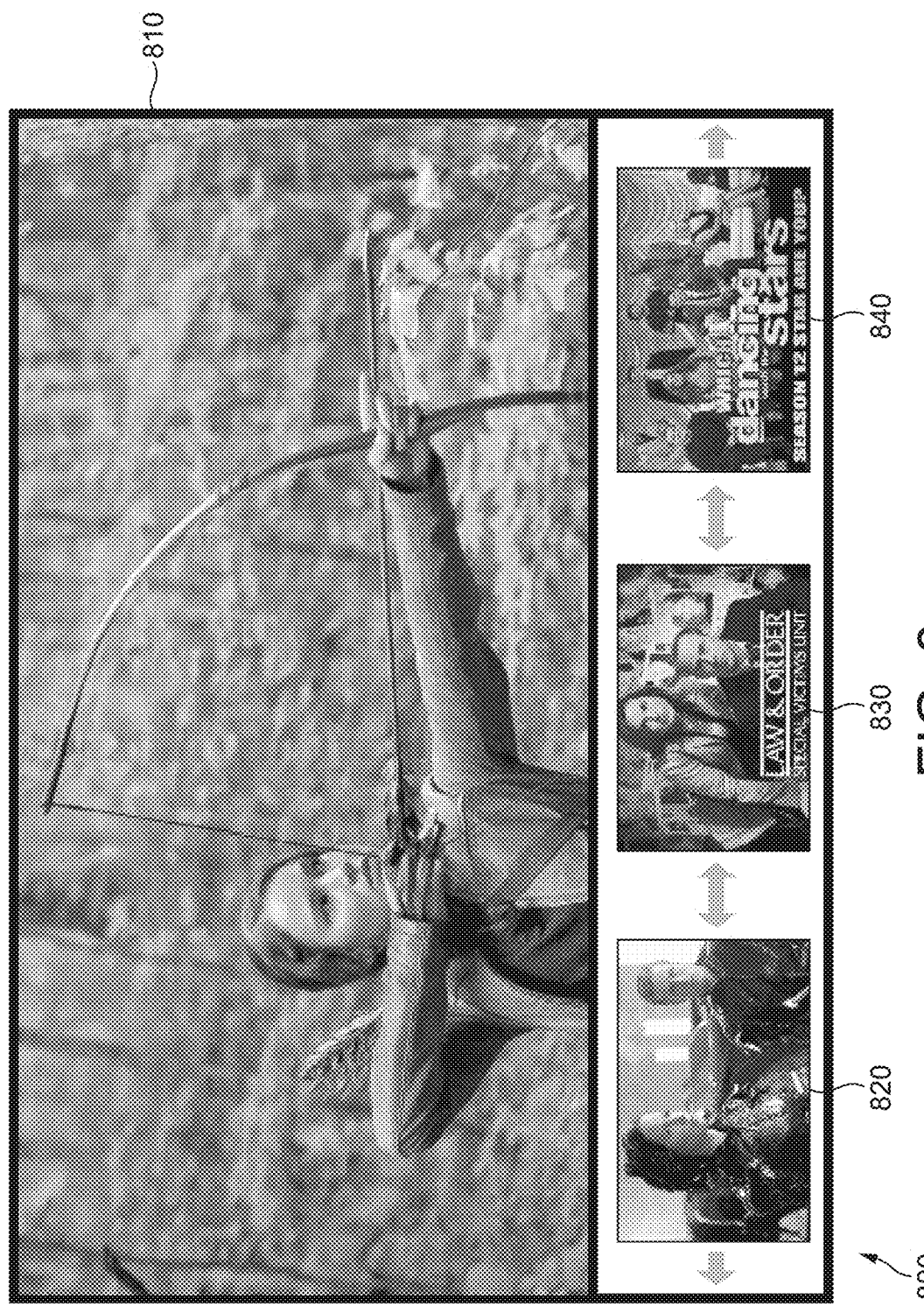
FIG. 8 is a diagram illustrating another exemplary view of a content display window including a visual timeline for media content navigation in accordance with the present disclosure.

Turning to FIG. 8, a diagram illustrating another exemplary view of a content display window 800 including a visual timeline for media content programming in accordance with the present disclosure is shown. Content display window 800 is shown as a visual display on a display device, such as described earlier.

In content display window 800, window 810 shows the currently viewed and displayed program content from a received channel from a service provider (e.g., broadcast affiliate manager 104 described in FIG. 1). A window 820 shows a visual thumbnail for a point in the program that was received and displayed at a time earlier in the program. In one embodiment, the currently viewed program is one hour long and the current time is 8:49 PM and the time increment between images is ten minutes. As a result, window 820 shows a thumbnail image for 8:40 PM. Window 830 shows a visual thumbnail for the next program available on the same received channel. Window 840 shows a visual thumbnail for the program available after the next program on the same received channel. It is important to note that although only one thumbnail for previously viewed content is shown in content display window 800, other embodiments may show more than one thumbnail for previously viewed content.

Content display window 700 and content display window 800 may also include text or other graphic symbols for the currently viewed content window or for each of the thumbnail display windows. In one embodiment, a text box indicating the time (e.g., absolute time or relative time) associated with each thumbnail image may be included below the thumbnail display windows. Graphic arrows may also be included between the thumbnail images and at each end to permit navigation between the images and scrolling to each end. In other embodiments, text indicating time may be located above the thumbnail display windows or be overlaid on the thumbnail image in an opaque or transparent text box.

It is important to note that the location and/or size of the currently viewed content windows and thumbnail display windows used in content display window 700 described in FIG. 7 and content display window 800 described in FIG. 8 may be different than as shown. Further, the format and/or aspect ratio of the windows may be changed in order to view more or less information (e.g., more or less thumbnail display windows). Further, content display window 700 or content display window 800 may stay visible on the display screen indefinitely or may be removed from the display after an additional user input (e.g., a button press on a remote control). Alternatively, content display window 700 or content display window 800 may remain on the screen for a predetermined period of time, such as 10 seconds before closing and returning to normal program display.

The present disclosure describes a program display structure that includes a portion of the display dedicated to thumbnails identifying fast forward and rewind navigation points in a visual timeline for a currently viewed program. The thumbnails represent time points in the program for the portion of the program that has already been received and/or viewed. These thumbnails also may be applied to identifying future programs planned or available. A receiving device buffers or stores the received and/or viewed content. The receiving device makes this content available for navigation features. The navigation feature makes the content navigable or browsable using a series of thumbnail images (e.g., still video frames from the content). A rewind browse feature is available by navigating one or more thumbnail images for the content that was already displayed. Further, a fast forward browse feature is available by navigating one or more thumbnails (e.g., poster or still video frame) for a future program at a point in the time at the end of the currently viewed program. Timeline display and navigation may be displayed and performed in terms of time relative to the current program or in terms of absolute time. Further, each thumbnail may represent its own video clip, which may be played when the user navigates to or pauses over the thumbnail.

Although embodiments which incorporate the teachings of the present disclosure have been shown and described in detail herein, those skilled in the art can readily devise many other varied embodiments that still incorporate these teachings. Having described preferred embodiments of a method and apparatus for managing a media content database on a device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
receiving a media content stream;
storing media content associated with the media content stream;
generating a plurality of images associated with the media content stream after it is received, by extracting still video frames from the stored media content, the plurality of images arranged in a visual timeline in order to navigate in the media content stream;
retrieving information for a future media content stream that is available after the media content stream is received; and
providing, on a same display screen window, the information for the future media content stream along with the plurality of images for display along with the media content stream, the future media content positioned at the end of the visual timeline, wherein the plurality of images associated with the stored media content is selectable on the same display screen window for navigating to a time in the visual timeline in the stored media content and the information for the future media content stream is also selectable on the same display screen window for providing additional information for the future media content stream.

2. The method of claim 1, wherein at least of one of the plurality of images represents a point in time in the received media content stream.

3. The method of claim 1, wherein the information for the future media content stream is text information from a program guide.

4. The method of claim 1, wherein the information for the future media content stream is an image.

5. The method of claim 1, wherein the media content stream is received from at least one of a broadcast content service provider or an internet content service provider.

6. The method of claim 1, wherein the plurality of images are at least one of a thumbnail, a poster, and a still video image from a portion of the media content stream.

7. The method of claim 1, wherein the plurality of images are arranged in a visual timeline in order to navigate in the media content stream.

8. The method of claim 7, wherein the information for the future media content stream includes a visual element for the future media content and is positioned at the end of the visual timeline.

9. The method of claim 7, wherein each of the plurality of images includes an indication of a time associated with at least one of the media content program and actual time.

10. The method of claim 1, further comprising navigating in the media content stream in response to a user input using the plurality of images.

11. The method of claim 10, wherein navigating in the media content stream includes providing the media content stream for display from a point in the media content stream that was previously received in response to selecting a thumbnail from the plurality of thumbnails.

12. The method of claim 10, wherein navigating in the media content stream includes providing the media content stream from a point in the media content stream that is ahead of the point in time for the media content stream currently being provided in response to selecting a thumbnail from the plurality of thumbnails.

13. The method of claim 10, wherein navigating in the media content stream includes providing a video clip for the media content stream starting from a point in time associated with a thumbnail in place of the thumbnail in response to hovering over the thumbnail.

14. An apparatus comprising:
an input signal receiver that receives a media content stream;
a storage device configured to store media content associated with the received media content stream;
a video processor coupled to the input signal receiver, the video processor generating a plurality of images associated with the media content stream after it is received, by extracting still video frames from the stored media content, the plurality of images arranged in a visual timeline in order to navigate in the media content stream;
a controller coupled to the video processor, the controller retrieving information for a future media content stream that is available after the media content stream is received; and
a display interface coupled to the video processor, the display interface providing, on a same display screen window, the information for the future media content stream along with the plurality of images associated with the media content stream for display along with the media content stream, the future media content positioned at the end of the visual timeline, wherein the plurality of images associated with the stored media content is selectable on the same display screen window for navigating to a time in the visual timeline in the stored media content and the information for the future media content stream is also selectable on the same display screen window for providing additional information for the future media content stream.

15. The apparatus of claim 14, wherein at least of one of the plurality of images represents a point in time in the received media content stream.

16. The apparatus of claim 14, wherein the video processor further extracts a visual element from the media content stream.

17. The apparatus of claim 14, wherein the plurality of images are arranged in a visual timeline in order to navigate in the media content stream.

18. The apparatus of claim 14, wherein each of the plurality of images includes an indication of a time associated with at least one of the media content program and actual time.

19. The apparatus of claim 14, further comprising a user interface coupled to controller, the user interface receiving a user input representing navigating in the media content stream using the plurality of images.

20. An apparatus comprising:
a means for receiving a media content stream;
a means for storing media content associated with the received media content stream;
a means for generating a plurality of images associated with the media content stream after it is received, by extracting still video frames from the stored media content;
a means for retrieving information for a future media content stream that is available after the media content stream is received; and
a means for providing the information, on a same display screen window, for the future media content stream along with the plurality of images for display along with the media content stream, wherein the plurality of images associated with the stored media content is selectable on the same display screen window for navigating to a time in the visual timeline in the stored media content and the information for the future media content stream is also selectable on the same display screen window for providing additional information for the future media content stream.

21. The apparatus of claim 20, wherein at least of one of the plurality of images represents a point in time in the received media content stream.

22. The apparatus of claim 20, wherein the information for the future media content stream is text information from a program guide.

23. The apparatus of claim 20, wherein the information for the future media content stream is an image.

24. The apparatus of claim 20, wherein the media content stream is received from at least one of a broadcast content service provider or an internet content service provider.

25. The apparatus of claim 20, wherein the plurality of images are at least one of a thumbnail, a poster, and a still video image from a portion of the media content stream.

26. The apparatus claim 20, wherein the information for the future media content stream includes a visual element for the future media content.

27. The apparatus of claim 20, wherein each of the plurality of images includes an indication of a time associated with at least one of the media content program and actual time.

28. The apparatus of claim 20, further comprising means for navigating in the media content stream in response to a user input using the plurality of images.

29. The apparatus of claim 28, wherein the means for navigating in the media content stream includes providing the media content stream for display from a point in the media content stream that was previously received in response to selecting a thumbnail from the plurality of thumbnails.

30. The method of claim 28, wherein the means for navigating in the media content stream includes providing the media content stream from a point in the media content stream that is ahead of the point in time for the media content stream currently being provided in response to selecting a thumbnail from the plurality of thumbnails.

31. The method of claim 28, wherein the means for navigating in the media content stream includes providing a video clip for the media content stream starting from a point in time associated with a thumbnail in place of the thumbnail in response to hovering over the thumbnail.

32. The apparatus of claim 14, wherein the information for the future media content stream is text information from a program guide.

33. The apparatus of claim 14, wherein the information for the future media content stream is an image.

34. The apparatus of claim 14, wherein the media content stream is received from at least one of a broadcast content service provider or an internet content service provider.

35. The apparatus of claim 14, wherein the plurality of images are at least one of a thumbnail, a poster, and a still video image from a portion of the media content stream.

36. The apparatus of claim 14, wherein the information for the future media content stream includes a visual element for the future media content.

37. The apparatus of claim 19, wherein the user interface further provides the media content stream for display from a point in the media content stream that was previously received in response to selecting a thumbnail from the plurality of thumbnails.

38. The apparatus of claim 19, wherein the user interface further provides the media content stream from a point in the media content stream that is ahead of the point in time for the media content stream currently being provided in response to selecting a thumbnail from the plurality of thumbnails.

39. The apparatus of claim 19, wherein the user interface further provides a video clip for the media content stream starting from a point in time associated with a thumbnail in place of the thumbnail in response to hovering over the thumbnail.

* * * * *

UNITED STATES PATENT AND TRADEMARK OFFICE
CERTIFICATE OF CORRECTION

| | |
|---|---|
| PATENT NO. | : 10,701,450 B2 |
| APPLICATION NO. | : 14/894693 |
| DATED | : June 30, 2020 |
| INVENTOR(S) | : Vijay Anand Selvaraj |

It is certified that error appears in the above-identified patent and that said Letters Patent is hereby corrected as shown below:

In the Claims

Column 24, Line 17: replace "method" with --apparatus--.
Column 24, Line 23: replace "method" with --apparatus--.

Signed and Sealed this
Seventeenth Day of May, 2022

*Katherine Kelly Vidal*

Katherine Kelly Vidal
*Director of the United States Patent and Trademark Office*